United States Patent [19]

Wang

[11] 4,065,731
[45] Dec. 27, 1977

[54] TANDEM LASER ASSEMBLY

[75] Inventor: Shing Chung Wang, Temple City, Calif.

[73] Assignee: Xerox Corporation, Stamford, Conn.

[21] Appl. No.: 680,563

[22] Filed: Apr. 27, 1976

[51] Int. Cl.$^2$ .............................................. H01S 3/22
[52] U.S. Cl. .............................................. 331/94.5 G
[58] Field of Search ........................ 331/94.5; 330/4.3

[56] References Cited

U.S. PATENT DOCUMENTS

| | | | |
|---|---|---|---|
| 3,516,009 | 6/1970 | Lipsett | 331/94.5 D |
| 3,624,548 | 11/1971 | Sosnowski | 331/94.5 T |

OTHER PUBLICATIONS

Ahmed et al., He-Ne-Cd Laser with Two Color Output. Proc., IEEE (Nov. 1969) pp. 2084 and 2085.

Primary Examiner—William L. Sikes
Attorney, Agent, or Firm—James J. Ralabate; Franklyn C. Weiss; Anthony W. Karambelas

[57] ABSTRACT

A laser system which produces multiline emissions simultaneously and which is adapted for use in optical data processing systems. In particular, in a first embodiment, a unitary positive column laser comprises two sections, the first section comprising a positive column helium-cadmium laser, the second section comprising a positive column helium-neon laser, the first and second sections being in tandem. Each section may be excited separately such that optimum excitation for red laser light, produced by the helium-neon section, and blue laser light, produced by the helium-cadmium section, can be independently controlled. The present system also allows separate cadmium vapor pressure control by separately controlling the vaporization temperature of the cadmium and also allows confinement of the cadmium vapor whereby the vapor does not contaminate one of the optical windows which confines the active laser medium. By proper selection of the optical cavity parameters, simultaneous red and blue laser oscillations can be obtained for application in any optical data processing system that requires a red and blue laser radiation source. In a second embodiment, the helium-cadmium section is replaced by with a helium-selenium section whereby the tandem laser system is capable of producing multiline laser radiation in the red, blue and green colors.

13 Claims, 2 Drawing Figures

TANDEM LASER ASSEMBLY

BACKGROUND OF THE INVENTION

The use of lasers in optical data processing systems such as facsimile devices, digital printers and the like have been disclosed in the prior art. A single laser which provides light of single wavelength may be generally utilized for scanning information on a document, the reflected radiation flux being electrically transferred to a storage device or utilized to reproduce the information as a copy of the original document. A scanning laser is generally utilized to reproduce the document information (or for printing puroses only). Typically, a helium-neon laser which generates red laser light when energized has been utilized in many scanning/reproducing applications. For example, Xerox Corporation, Stamford, Connecticut, recently introduced a facsimile device, the Xerox Telecopier 200 (Xerox ® and Telecopier ® are registered trademarks of Xerox corporation) transceiver, which records on plain paper. The transceiver employs a low-energy helium-neon laser and uses the xerographic principle to receive and print messages on ordinary, unsensitized paper. Basically, when the transceiver is in the transmit mode, the laser provides a small stable beam of light to raster scan the original document. The reflected light is detected by a photosensor which translates the white and black of the document to electrical logic levels which may be transmitted by a phone line to a remote transceiver set to the receive mode. The receiver transceiver directs the laser beam onto a xerographic drum and by electrically modulating the laser with "1" and "0" logic levels in synchronism with the transmitter produces a copy of the original.

However, it would be desirable if a single laser could be provided to produce simultaneous laser radiation of more than one wavelength to allow the accurate reproductions of documents which contain information in other than black and white form i.e. multicolored documents.

Although lasers have been produced in the prior art which are capable of producing multiline emissions simultaneously, such as a argon laser, these lasers are generally expensive and large in size, making them inpractical for use in commercial systems, such as the Telecopier 200 transceiver described hereinabove.

An article in the Proceedings of the IEEE, He-Ne-Cd Laser With Two Color Output, S. A. Ahmed et al, Nov. 1969, pages 2084-2085, describes, inter alia, a helium-neon-cadmium laser which produces simultaneous lasing at 4416A and 6328A. However, the laser discharge essentially occurs through a single discharge tube and separate control of the blue (4416A) and red (6328A) laser light is not provided making accurate adjustment of each individual color extremely difficult.

Therefore, a simplified and relatively inexpensive laser which can produce multiline emissions simultaneously, which can be independently controlled and which can be adapted for commercial utilization would satisfy an apparent need in optical data processing technology.

SUMMARY OF THE PRESENT INVENTION

The present invention provides a laser system which produces multiline emissions simultaneously and which is adapted for use in optical data processing systems. In particular, in a first embodiment, a unitary positive column laser comprises two sections, the first section comprising a positive column helium-cadmium laser, the second section comprising a positive column helium-neon laser, the first and second sections being in tandem. Each section may be excited separately such that optimum excitation for red laser light, produced by the helium-neon section, and blue laser light, produced by the helium-cadmium section, can be independently controlled. The present system also allows separate cadmium vapor pressure control by separately controlling the vaporization temperature of the cadmium and also allows confinement of the cadmium vapor whereby the vapor does not contaminate one of the optical windows which confines the active laser medium. By proper selection of the optical cavity parameters, simultaneous red and blue laser oscillations can be obtained for application in any optical data processing system that requires a red and blue laser radiation source. In a second embodiment, the helium-cadmium section is replaced with a helium-selenium section whereby the tandem laser system is capable of producing multiline laser radiation in the red, blue and green colors.

It is an object of the present invention to provide a laser system which is capable of producing multiline laser radiation.

It is a further object of the present invention to provide a laser system for producing multiline radiation, said system including positive column laser sections arranged in tandem, each section having different active mediums incorporated therein.

It is still a further object of the present invention to provide a multiline laser device which incorporates positive column sections arranged in tandem, each section incorporating a different active medium therein, the active medium in the first section comprising a gas, the active medium in the second section comprising a metal.

It is still an object of the present invention to provide a laser system comprising two positive column sections arranged in tandem for producing red and blue laser radiation in a first embodiment and red, blue and green in a second embodiment.

BRIEF DESCRIPTION OF THE DRAWINGS

For a better understanding of the invention as well as other objects and further features thereof, reference is made to the following description which is to be read in conjunction with the following wherein.

DESCRIPTION OF THE PREFERRED EMBODIMENTS

Figure 1:
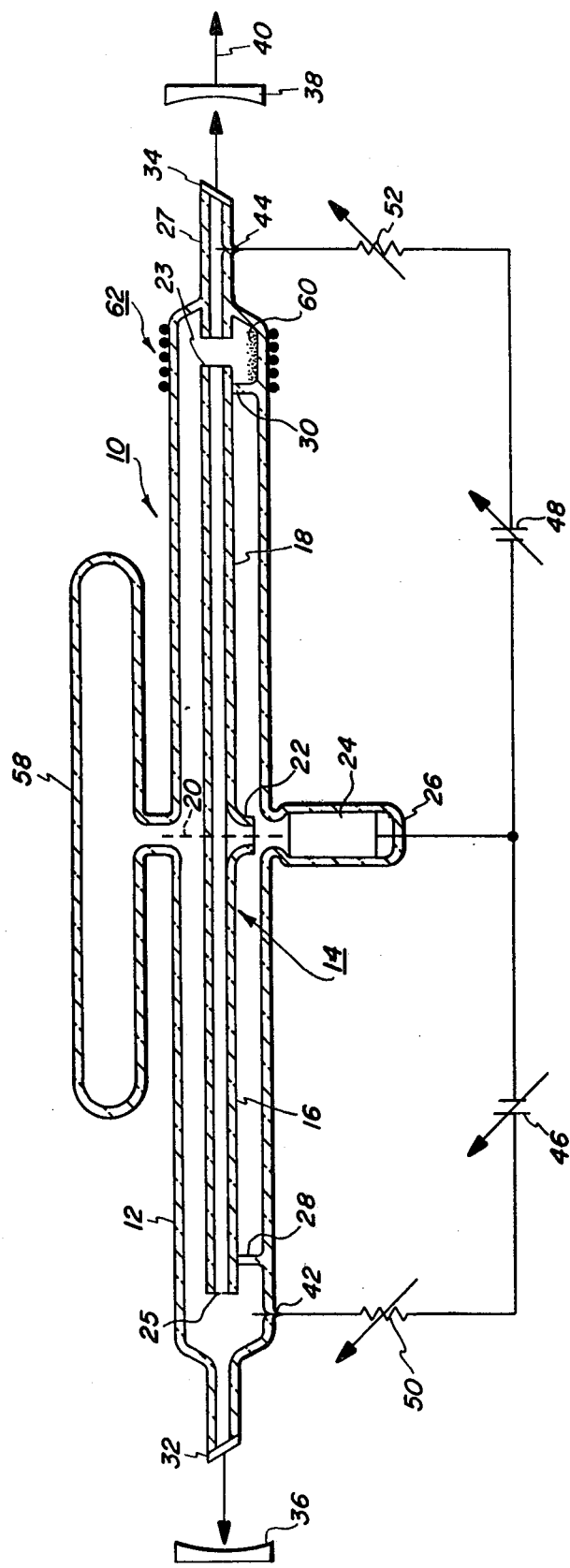
FIG. 1 shows a first embodiment of the present invention which simultaneously generates red and blue laser light.

Referring now to FIG. 1, a first embodiment of the laser assembly 10 of the present invention is illustrated. Laser assembly 10 comprises an outer tube envelope 12, made of quartz glass for example, and a unitary inner capillary discharge tube 14. Although shown as a single, unitary structure, capillary discharge tube 14, in essence, comprises two positive column sections 16 and 18 joined in tandem at reference plane 20. Capillary discharge tube 14, typically comprising glass, has an appendage 22 positioned adjacent cathode electrode 24 within bulb portion 26. A coaxially aligned capillary tube portion 27, typically 5 centimeters in length and made of glass is separated from end 23 of capillary tube 18 by a distance of approximately 2 centimeters. The outer tube envelope 12 has a typical diameter of 25 millimeters and a length of 60 centimeters from window to window whereas discharge tube 14 has a typical length of 50 centimeters, an inner diameter of 2 millimeters and an outer diameter of 4 millimeters. The inner discharge tube 14 is supported within envelope 12 by glass plate 28 and 30. The ends of tube envelope 12 are sealed by transparent windows 32 and 34 joined to the envelope at the Brewster angle as is well known in the art. End 25 of discharge tube 14 is approximately 3 centimeters from window 32. A fully reflecting mirror 36 is positioned adjacent window 32 and a partially transmissive mirror 38 is positioned adjacent window 34 to form the optical cavity necessary to provide for lasing action. As will be set forth hereinafter, mirrors 36 and 38 are appropriately coated with layers of dielectric material such that only a laser beam 40 of a desired wavelength is transmitted by mirror 38, beam 40 being utilized by external apparatus such as for scanning purposes as set forth hereinabove.

Anode pins 42 and 44 are inserted into the space within envelope 12 as shown and are glass sealed to the envelope using standard glass sealing techniques.

Voltage sources 46 and 48 are connected between anode pin 42 and cathode 24 and anode pin 44 and cathode 24, respectively. Voltage source 46 and 48 are selected to be variable for control purposes as will be set forth hereinafter.

In a first embodiment, a helium-neon gas mixture is filled within envelope 12 by standard techniques well known in the art, to a predetermined helium-neon total pressure. Gas reservoir 58 serves to store an added supply of helium-neon gas which is utilized to replace gas which may have escaped from within the inner envelope due to gas permeation through the window seals. In a first embodiment, a few grams, typically 3 to 4 grams, of cadmium metal 60 is placed within the envelope 12. A heater 62 is provided to vaporize the cadmium to a preselected pressure as described hereinbelow.

Although laser assembly 10 functions as a single, unitary device, for purposes of explanation, both sections of the tube on either side of plane 20 will be described separately. The left hand section of the assembly operates as a positive column helium-neon laser tube would operate. That is, the helium-neon gas is introduced into envelope 12 at a preselected pressure (for example helium at 3.0 Torr and neon at 0.3 Torr) and a discharge is initiated between anode pin 42 and cathode 24, typically in the range from abut 5 to about 10 milliamps, by maintaining a voltage of approximately 1Kv therebetween by adjusting source 46 and adjustable ballast resistor 50, Ballast resistor 50 functions to limit and adjust the discharge current. The electrical discharge (from anode 42, through tube 16 and to cathode 24), excites the helium atoms to a metastable state which, due to inelastic collisions of the second kind, transfers energy to the neon atoms which are elevated to the population inversion state. The neon atoms, in falling to a lower energy state, emit a laser light of a frequency corresponding to the two different energy levels as is well known in the art. For helium-neon red lasers, a light of a wavelength of 6328A is generated. Brewster windows 32 and 34 are utilized in laser assemblies to generate polarized light of the desired wavelength. Mirrors 36 and 38 are optically aligned with the Brewster windows and the axis of discharge tube 14.

A cadmium charge 60 is deposited in the right hand section of the laser assembly 10 prior to laser tube operation. Heater 62 is energized and the cadmium metal is vaporized. Since tube sections 18 and 27 are spaced apart as shown, cadmium vapor diffuses into the bores of each section. The preferred vapor pressure is attained by controlling the cadmium temperature. In particular, the cadmium temperature is maintained at approximately 280° C by appropriate control of heater 62. Also confined within sections 18 and 27 is gaseous helium and neon at a pressure as set forth hereinabove with reference to the left hand section. A discharge, typically in the range from about 60 to about 100 milliamps, is initiated between electrode 24 and anode pin 44 via voltage source 48 and adjustable ballast resistor 52, ballast resistor 52 functioning to limit and adjust the discharge current from anode 44 to cathode 24. The discharge excites the helium atoms to a metastable excited state from which energy is transferred to the vaporized cadmium atoms. This causes the cadmium atoms to ionize to an excited state required for lasing action. The ionized cadmium atoms are then transported along the length of the discharge confining bore tube sections 18 and 27 to cathode 24 via the process of cataphoresis in a manner well known in the art. Tube section 27, in addition to providing a discharge path from anode 44 to section 18 and hence to cathode 24, also provides for cataphoretic confinement of the cadmium vapor whereby vapor condensation on window 234 is minimized. When the excited ionized cadmium ions return towards a lower energy state, laser radiation at 4416A (blue) is produced.

The separate control of the voltage and current applied to each section allows the optimum excitation (discharge current) for the red and blue colors to be controlled independently.

Preferably, both sections should be discharged simultaneously to obtain the red and blue colors. Although each section, as set forth hereinabove, are controlled separately by power supplies 46 and 48 and ballast resistors 50 and 52, respectively, control means (not shown) could be provided to ensure that each discharge does occur simultaneously. Additionally, this configuration also allows the vapor pressure of the cadmium to be separately controlled by heater 62. The electric field between anode pin 44 and cathode 24, typically 1Kv, also functions to accelerate the vaporized cadmium ions from the region nearest the translucent window 34 thereby preventing contamination of the window 34.

In summary, after the initial discharge is initiated and the cadmium vaporized, voltage sources 46 and 48 cause lasing action to occur. The left hand section provides red laser light, the right hand section provides blue laser light notwithstanding the presence of helium-neon gas therein (helium-cadmium interaction predominates over the helium-neon interaction).

The dielectric coatings on mirrors 36 and 38 are selected so that only red and blue light (combined in one beam 40) is transmitted by mirror 38 and totally reflected by mirror 36. Typical dielectric coatings include alternate layers of titanium and silicon dioxide, each layer having a predetermined thickness.

It should be noted that the temperature applied to the cadmium charge 60 determines its vapor pressure (and thus the intensity of the light produced), the cadmium pressure essentially not being affected by the helinum-neon pressure.

Although not shown in FIG. 1, the simultaneous generation of red and blue light as a single beam 40 can be dispersed into its separate component colors by using a prism or appropriate light filters.

Figure 2:
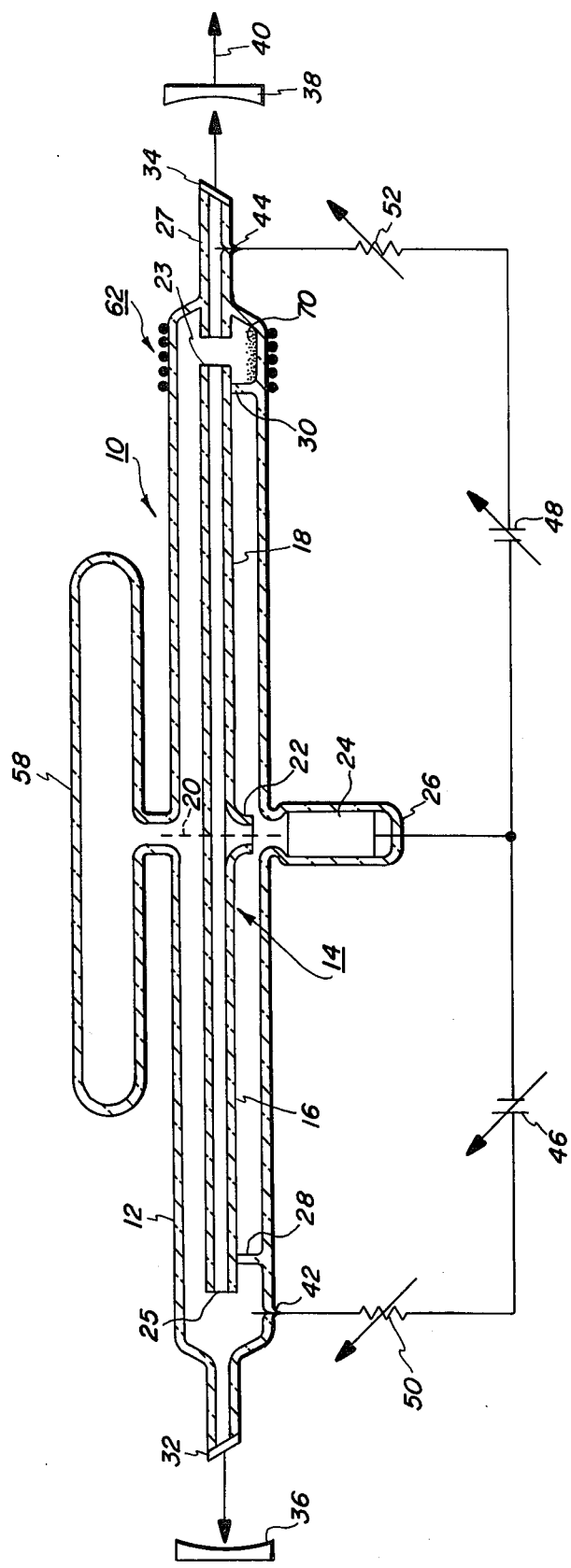
FIG. 2 shows a second embodiment of the present invention which simultaneously generates red, green and blue (white) laser light.
Figure 1:
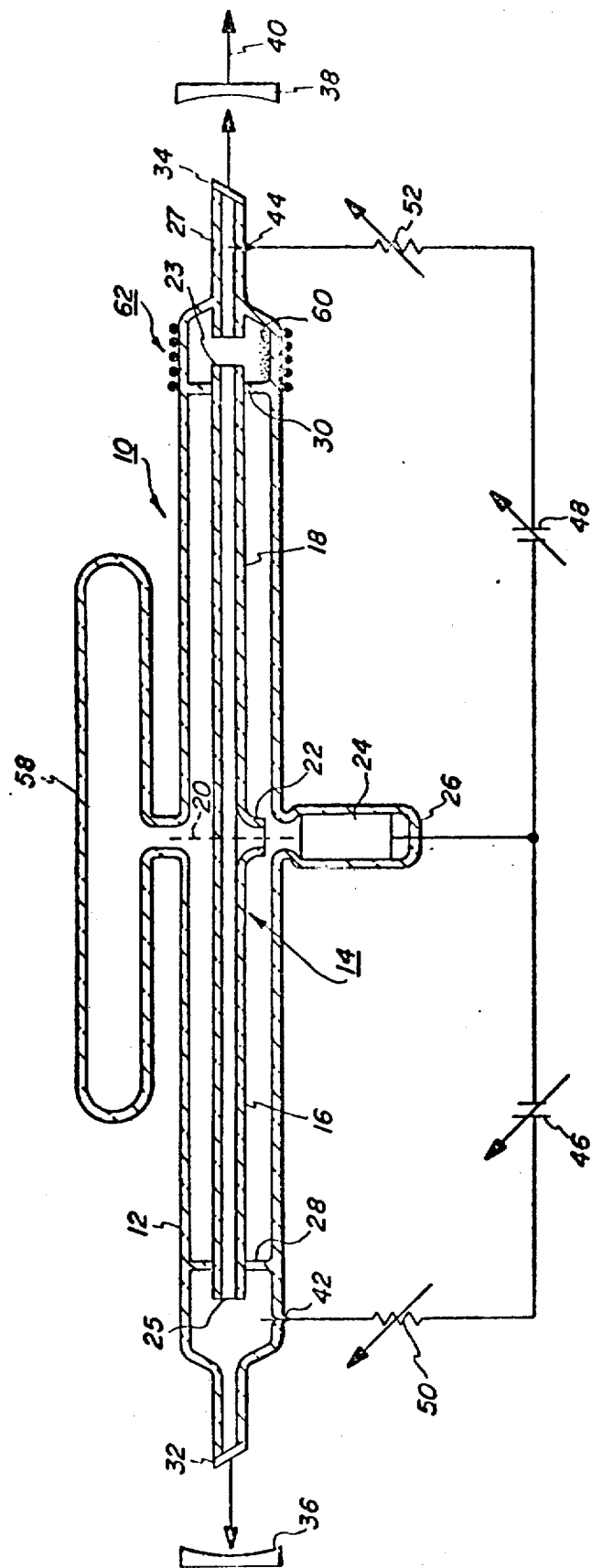
Figure 2:
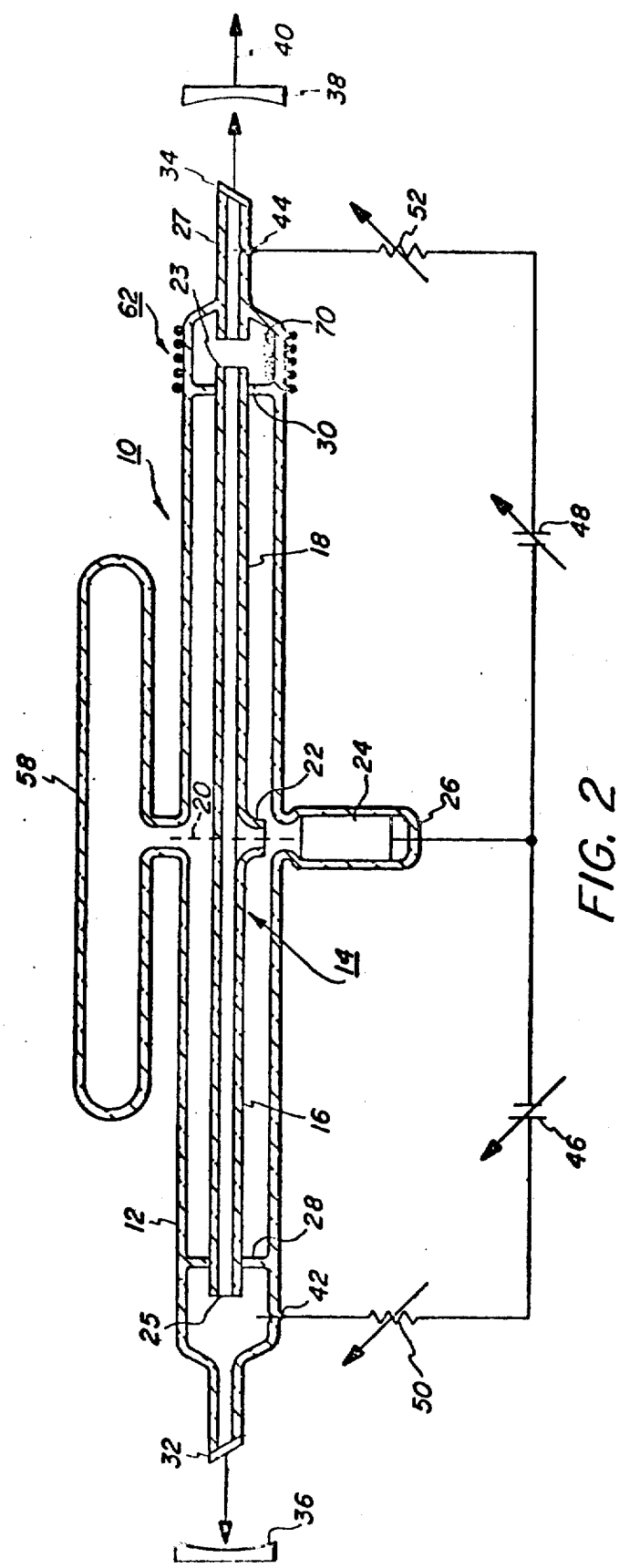

Referring now to FIG. 2, a second embodiment of the present invention is illustrated. The embodiment shown is substantially identical to that shown in FIG. 1, the only difference being a charge 70 of selenium metal, typically 3 to 4 grams, is utilized in the right hand section instead of cadmium. Selenium vapor, when maintained at a preferred temperature of 270° C by heater 62, interacts with the helium-neon gas wherein the helium ions and/or metastable atoms cause the selenium atoms to be positively ionized and excited to a higher energy state. When the excited selenium ions return to its initial or ground state. multiline emissions, including blue and green laser light is produced. The blue and green laser light emissions include the following wavelengths: 4604A (blue), 4976A (blue-green), 5069A (green), 5176A (green), and 5306A (green). The confinement of the selenium vapor is identical to the process described with reference to FIG. 1 herein-above In operation, after vaporizing the selenium to the appropriate vapor pressure and initiating the discharge in both sections (typically 5 to about 10 milliamps in section 16 and 50 to about 100 milliamps in section 18) the voltage sources 46 and 48 act independently to maintain and control the discharge for lasing action. With broadband high reflecting mirror 36 and transmitting mirror 38, the red, blue and green (white) laser light are simultaneously generated and transmitted as beam 40. As set forth hereinabove with reference to FIG. 1, the separate color components of beam 40 can be obtained by utilizing a prism to disperse each color component or by providing appropriate color filters.

The laser assembly described with reference to FIGS. 1 and 2 hereinabove provides a multiline laser source for many applications, such as laser scanning as described hereinabove.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A laser discharge tube for producing an output laser beam having a plurality of wavelengths comprising:
   a unitary positive column laser comprising first and second capillary discharge sectiions, said sections containing respectively a first and second active laser medium,
   a tube envelope for enclosing said first and second active lasing media,
   a discharge tube having first and second end portions supported within said tube envelope forming a resonant laser cavity, said discharge tube having an opening located between said first and second end portions,
   a first electrode positioned adjacent said first discharge tube end,
   a second electrode positioned adajcent said discharge tube opening,
   a third electrode positioned adjacent said second tube, and
   means for applying an electrostatic potential between said first, second and third electrodes of a polarity to maintain a first discharge between said first electrode and said second electrode through (a) said first portion of said discharge tube whereby said first active lasing medium produces a first laser beam of a single wavelength and to maintain a second discharge between the third and second said electrodes through said second portion of said discharge tube whereby said second active lasing medium produces a second laser beam comprising at least one wavelength, said first and second laser beams being combined into a laser output beam having a plurality of wavelengths.

2. The laser discharge tube as defined in claim 1 wherein said applying means comprises a first voltage source coupled between said first and second electrodes and a second voltage source coupled between said second and third electrodes.

3. The laser discharge tube as defined in claim 2 wherein said first and second voltage sources are adjustable whereby said first and second laser beams are independently optimized.

4. The laser discharge tube as defined in claim 1 wherein said first active lasing medium comprises a gas and said second active lasing medium comprises vaporized metal.

5. The laser discharge tube as defined in claim 4 wherein said gas comprises a mixture of helium and neon and said metal comprises cadmium, said first laser beam comprising red laser light and said second laser beam comprising blue laser light.

6. The laser discharge tube as defined in claim 4 wherein said gas comprises a mixture of helium and neon and said metal comprises selenium, said first laser beam comprising red laser light and said second laser beam comprising blue and green laser light.

7. The laser discharge tube as defined in claim 1 wherein said first and third electrodes comprise anodes and said second electrode comprises a cathode.

8. The laser discharge tube as defined in claim 1 wherein the ends of said tube envelope are sealed by Brewster windows and further including optical mirrors coaxially aligned and adjacent each of said Brewster windows.

9. The laser discharge tube as defined in claim 8 wherein one of said optical mirrors is reflective of said first and second laser beams and the other of said optical mirrors partially transmits said first and second laser beams as said combined laser output beam.

10. The laser discharge tube as defined in claim 1 wherein said tube envelope has a reservoir operatively associated therewith and containing an additional quantity of said first active lasing medium.

11. The laser discharge tube as defined in claim 1 wherein said first active lasing medium comprises a gas and said second active lasing medium is a metal which has been vaporized, said metal being positioned within said envelope near the second end portion of said tube.

12. The laser discharge tube as defined in claim 11 further including another discharge tube section within said envelope one end of which is spaced from the end of said second portion of said discharge tube, said third electrode being positioned within sid discharge tube section, said second discharge being between said second and third electrodes through said discharge tube section and said second portion of said discharge tube.

13. The laser discharge tube as defined in claim 12 further including an end member sealed to the other end of said discharge tube section.

* * * * *

UNITED STATES PATENT AND TRADEMARK OFFICE
CERTIFICATE OF CORRECTION

PATENT NO. : 4,065,731

DATED : December 27, 1977

INVENTOR(S) : Shing Chung Wang

It is certified that error appears in the above-identified patent and that said Letters Patent are hereby corrected as shown below:

Column 5, line 54, delete "sectiions" and insert --sections-- therefor.

Column 6, line 4, delete "(a)". On line 62, delete "sid" and insert --said-- therefor.

Support members 28 and 30 in Figures 1 and 2 have been corrected as shown in the attached photocopies.

Signed and Sealed this

Nineteenth Day of June 1979

[SEAL]

Attest:

RUTH C. MASON
Attesting Officer

DONALD W. BANNER
Commissioner of Patents and Trademarks